(12) United States Patent
He

(10) Patent No.: US 11,754,160 B2
(45) Date of Patent: Sep. 12, 2023

(54) TORQUE CONVERTER

(71) Applicant: Exedy Globalparts Corporation, Belleville, MI (US)

(72) Inventor: Hanjun He, Canton, MI (US)

(73) Assignee: Exedy GlobalParts Corporation, Belleville, MI (US)

( * ) Notice: Subject to any disclaimer, the term of this patent is extended or adjusted under 35 U.S.C. 154(b) by 0 days.

(21) Appl. No.: 17/703,502

(22) Filed: Mar. 24, 2022

(65) Prior Publication Data

US 2022/0307579 A1   Sep. 29, 2022

Related U.S. Application Data

(60) Provisional application No. 63/166,700, filed on Mar. 26, 2021.

(51) Int. Cl.
*F16H 45/02*   (2006.01)

(52) U.S. Cl.
CPC ..... *F16H 45/02* (2013.01); *F16H 2045/0205* (2013.01); *F16H 2045/0294* (2013.01)

(58) Field of Classification Search
CPC .. F16D 33/18; F16H 45/02; F16H 2045/0221; F16H 2045/0294
See application file for complete search history.

(56) References Cited

U.S. PATENT DOCUMENTS

| | | | |
|---|---|---|---|
| 4,353,444 A * | 10/1982 | Bionaz | F16H 45/02 192/3.29 |
| 10,197,105 B2 * | 2/2019 | Clark | F16D 25/0635 |

* cited by examiner

*Primary Examiner* — Huan Le
(74) *Attorney, Agent, or Firm* — Honigman LLP; Eric J. Sosenko

(57) ABSTRACT

A torque converter having a shell formed by a front cover assembly and a rear cover. The front cover assembly further includes a front cover and a front boss, with the front boss being fixedly mounted to the front cover. The torque converter further including an impeller, a turbine located within the shell, a lock-up clutch and a piston. The piston being axially moveable relative to the front cover assembly along a central axis of the torque converter. A leaf spring, positioned between the piston and the front cover assembly, connects the piston to the front cover assembly.

20 Claims, 8 Drawing Sheets

TORQUE CONVERTER

CROSS REFERENCE TO RELATED APPLICATION

This application is a nonprovisional patent application claiming the benefit of previously filed U.S. provisional patent application No. 63/166,700, filed Mar. 26, 2021, the entire contents of which are herein incorporated by reference.

BACKGROUND

1. Field of the Invention

This application is The present invention generally relates to torque converters. Specifically, the invention relates to the connection between the front cover and the piston of a torque converter, and more specifically wherein the torque converter includes a dual facing clutch.

DESCRIPTION OF RELATED ART

A torque converter in accordance with a known construction is seen in FIG. 1. As illustrated therein, the torque converter (1) includes a dual facing clutch (20). A piston (18) operates to engage the clutch (20) and is required to connect to the front cover in both an circumferential direction and an axial directions in order to transfer torque from the engine to the transmission.

In the torque converter (1) of FIG. 1, a ring plate (64) is used for this connection. The front cover is welded to a front boss/support ring (14/42), and the ring plate (64) is provided as separate component apart from the front boss/support ring (14/42) and the front cover. The piston (18) is supported for axial movement on the front boss/support ring (14/42) and is located between the front cover and the ring plate (64). To secure the piston (18) to the ring plate (64), leaf springs (63) are employed. To connect the ring plate (64) to the front boss/support ring (14/42), the ring plate (64) is welded to the front boss (14). As a result, a weld is located inside the torque converter, Which can cause a quality risk due to contamination.

In an alternative construction, the ring plate is omitted and the piston is connected to the front cover by the leaf springs. In this construction, one end of the leaf spring is riveted to the piston and the other end is riveted to the front cover. To enable riveting of the leaf spring to the front cover, a hole is necessarily formed in the piston. This hole must be subsequently capped to prevent oil from leaking through the piston.

SUMMARY

In overcoming the enumerated drawbacks and other limitations of the known art, a novel construction for a torque converter is provided.

In one aspect of the invention, a torque converter is provided having a shell that includes a front cover assembly and a rear cover. The shell defines a central axis, and the front cover assembly is made up of a front cover and a front boss, with the front boss being mounted to the front cover. The torque converter further includes an impeller, a turbine located within the shell, a lock-up clutch, a piston that is axially moveable relative to the front cover assembly along the central axis, and a leaf spring positioned between the piston and the front cover assembly. The leaf spring connects the piston to the front cover assembly.

In another aspect, the leaf spring is connected to the piston by at least one rivet and the leaf spring is connected to the front cover assembly by at least one rivet.

In a further aspect, the leaf spring is connected to the front boss of the front cover assembly by a rivet.

In still another aspect, the leaf spring is connected to the front boss of the front cover assembly by a rivet.

In yet a further aspect, the front cover includes a central aperture and the front boss is mounted in the central aperture to the front cover.

In another aspect, the leaf spring is one of a plurality of leaf springs.

In an additional aspect, each leaf spring is separate and independent from other leaf springs.

In a further aspect, the leaf spring is a one-piece leaf spring connected to the piston at multiple locations about the piston, the leaf spring being connected to the connected to the piston by a rivet at each of the multiple locations about the piston.

In still another aspect, the piston is supported on an axially extending hub of the front boss.

In yet a further aspect, the leaf spring is connected to front cover assembly at a radially extending flange of the front boss.

In an additional aspect, the front boss includes a radially extending flange that overlies a radially extending portion of the front cover.

In another aspect, the radially extending flange is in surface-to-surface contact with the front cover.

In a further aspect, the radially extending flange is positioned on an interior side of the front cover assembly.

In an additional aspect, the front boss is welded to the front cover.

In yet another aspect, the front boss is welded to the front cover on an exterior surface of the torque converter.

In still another aspect, a hole and cap are not required in the piston to enable securing of the leaf spring to the front cover and a weld is not required inside the torque converter.

Further objects, features and advantages of this invention will become readily apparent to persons skilled in the art after review of the following description with reference to the drawings and the claims that are appended to inform a part of this specification.

DETAILED DESCRIPTION

As used in the description that follows, directional terms such as "upper" and "lower" are used with reference to the orientation of the elements as presented in the figures. Accordingly, "upper" indicates a direction toward the top of the figure and "lower" indicates a direction toward the bottom of the figure. The terms "left" and "right" are similarly interpreted. The terms "inward" or "inner" and "outward" or "outer" indicate a direction that is generally toward or away from a central axis of the referred to part whether or not such an access is designated in the figures. An axial surface is therefore one that faces in the axial direction. In other words, an axial surface faces in a direction along the central axis. A radial surface therefore faces radially, generally away from or toward the central axis. It will be understood, however, that in actual implementation, the directional references used herein may not necessarily correspond with the installation and orientation of the corresponding components or device.

Figure 1:
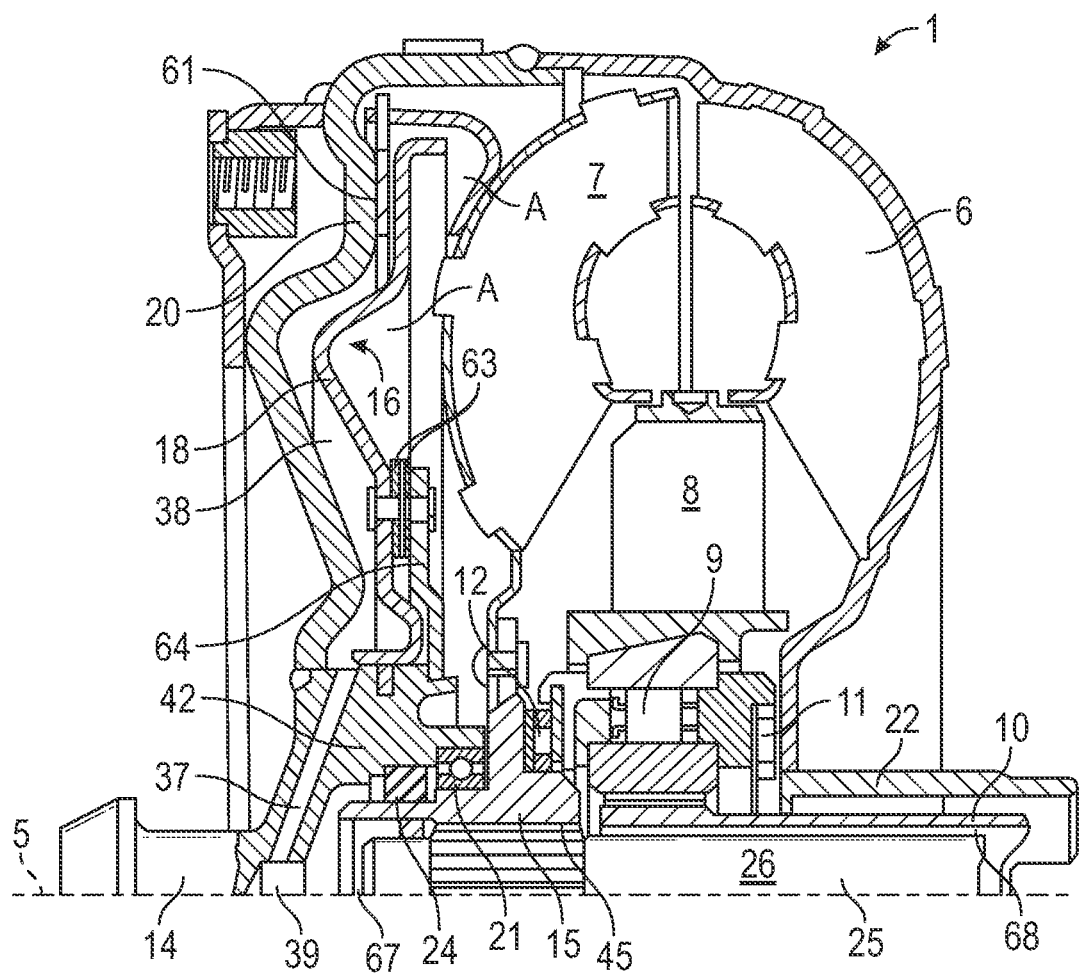
FIG. 1 is a cross-sectional view of a torque converter exemplifying a construction according to the prior art.
Figure 2:
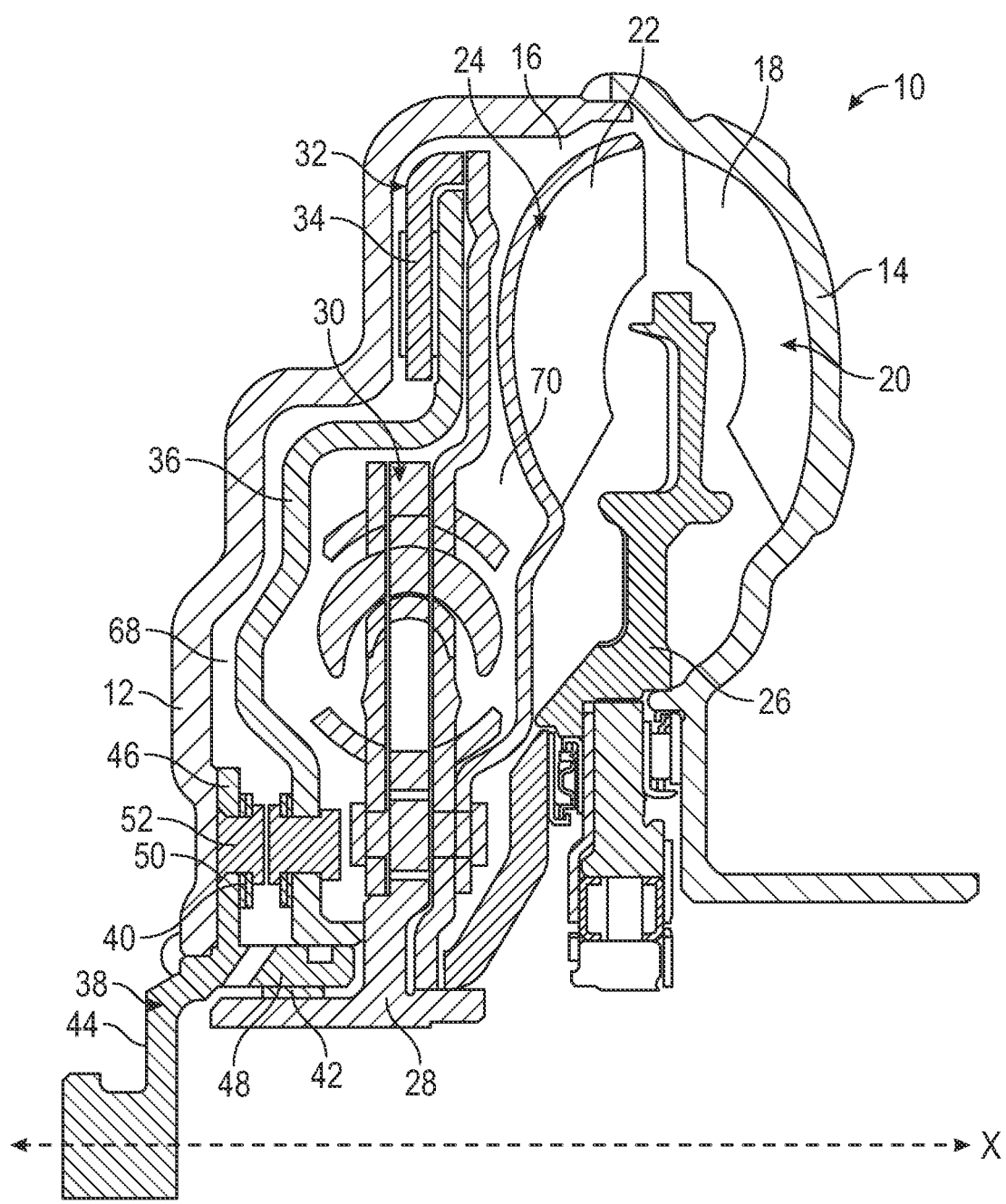
FIG. 2 is a cross-sectional view of a torque converter embodying the principles of the present invention.

Referring now to the drawings, a torque converter 10 embodying the principles of the present invention is generally illustrated in FIG. 2. Rotational input from an engine (not shown) is transmitted to the front cover 12 and subsequently to the back cover 14. The front and back covers 12, 14 define an internal chamber 16 where a hydrodynamic circuit may be formed to transfer torque through the torque converter 10 to a transmission (not shown). To facilitate this transfer, the rear cover 14 includes vanes 18 so as to form an impeller 20 that directs the hydrodynamic fluid toward the vanes 22 of a turbine 24 to rotationally drive the turbine 24. From the turbine 24, the fluid is directed back toward the impeller 20. A stator 26, position between the turbine 24 and the impeller 20, redirects the fluid so as to efficiently transfer the fluid to the impeller 20, multiplying the torque being transferred. The turbine 24 is connected to a turbine hub 28, and the turbine hub 28 transfers torque to the transmission.

A damper assembly 30 is coupled to the turbine 24 to reduce vibrations and oscillations, from the engine, that are transmitted to the transmission. The damper assembly 30 may be one of a number of different conventional and known damper constructions. Accordingly, the details of the construction and operation of the damper assembly 30 are not further provided herein. A lock-up clutch assembly 32 is also provided to allow the torque converter 10 to lock the input with the output being transmitted to the transmission and bypass the hydrodynamic circuit.

The clutch assembly 32 includes a twin or dual facing clutch 34 located between the front cover 12 and a piston 36. During a lock-up ON condition, the piston 36 will move toward to front cover 12 (to the left in FIG. 2) to clamp the dual facing clutch 34 between the piston 36 and the front cover 12. Engine torque will then be transferred from the front cover 12 and piston 36 to the clutch assembly 32, through the damper 30, and then to the transmission.

As seen in the FIGS. 2-7, the traditional front cover is split into two parts, a front boss 38 and a front cover 12. The piston 36 is connected to the combined front boss 38 and front cover 12 to transfer 50% of the torque into the clutch assembly 32. The other 50% of the torque is transferred directly from the front cover 12 to the clutch assembly 32. The piston 36 also needs to move freely in the axial direction so as to establish the lock-up ON and lock-up OFF conditions of the torque converter 10. As further discussed below, leaf springs 40 are used for the connection between front boss/front cover 12 and the piston 36

The front boss's function is to pilot the torque converter 10 to the engine crank shaft, to pilot and support the piston 36 and bushing 42 of the turbine hub 28, to provide an oil flow route to the lock-up OFF chamber, and to connect with the piston 36 so as to transfer engine torque to the clutch 34.

Figure 3:
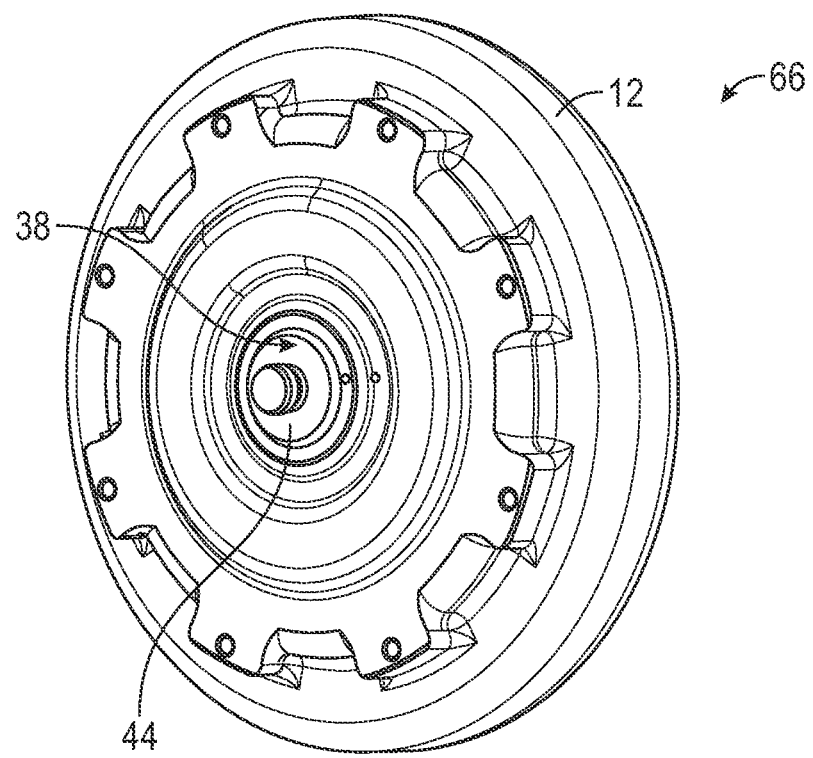
FIG. 3 is a perspective front view of the front cover, front boss and piston of the torque converter seen in FIG. 2.
Figure 4:
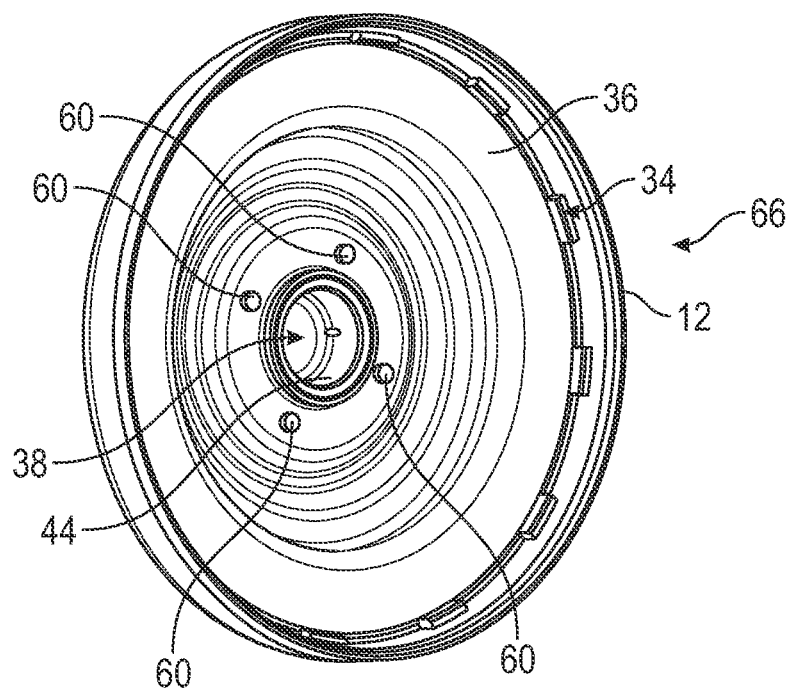
FIG. 4 a perspective rear view of the front cover, front boss and piston of the torque converter seen in FIG. 2.
Figure 5:
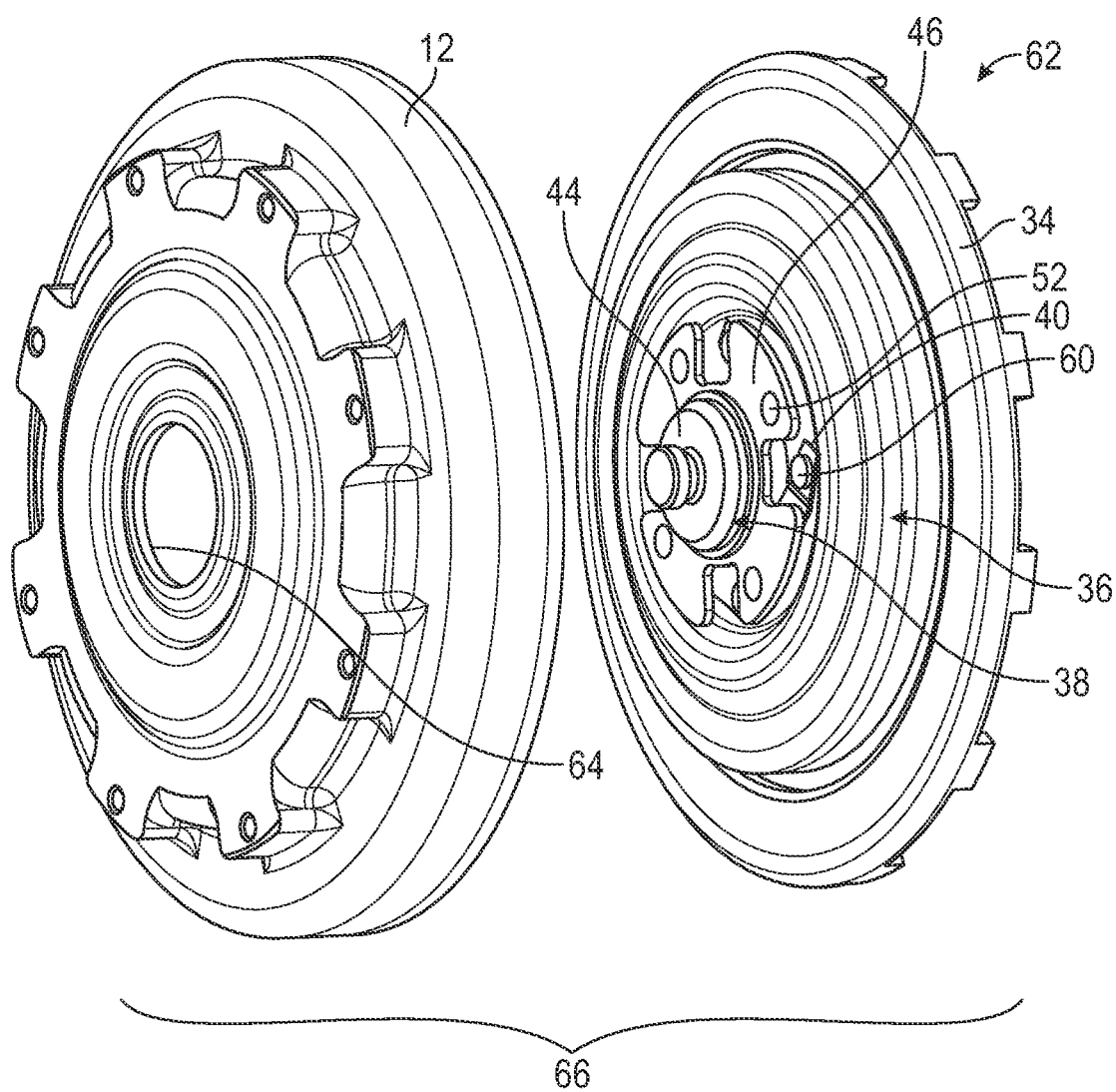
FIG. 5 is an exploded view of the front cover, front boss, piston and clutch assembly.
Figure 6:
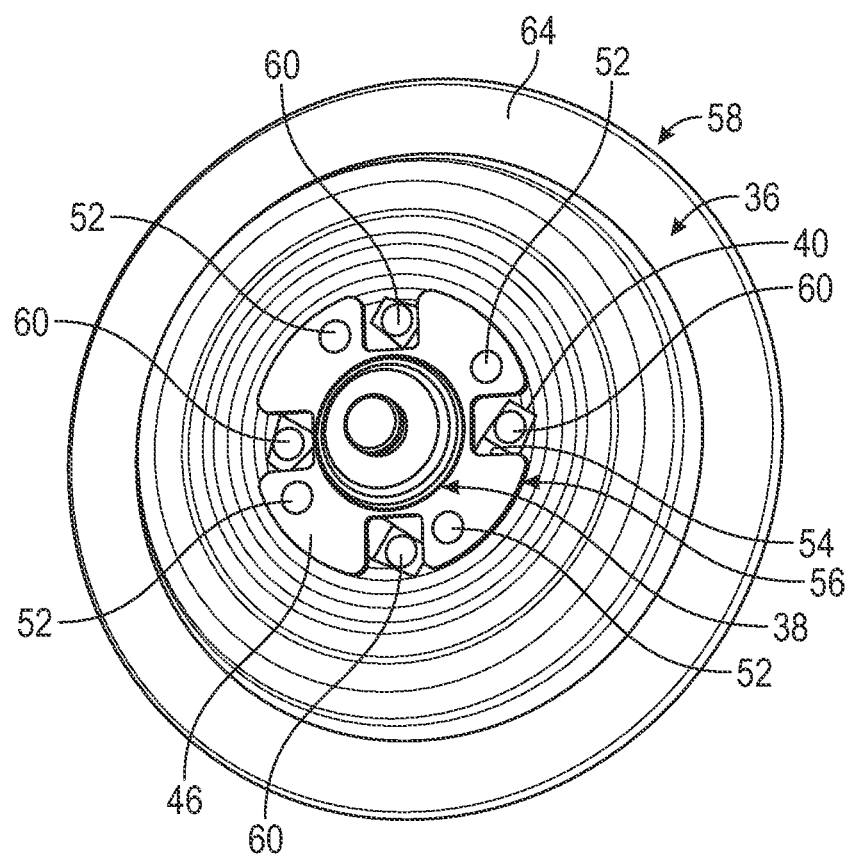
FIG. 6 is an enlarged view of the front boss, piston and leaf springs seen in FIG. 5 and showing the leaf springs riveted to the piston and the front boss.
Figure 7:
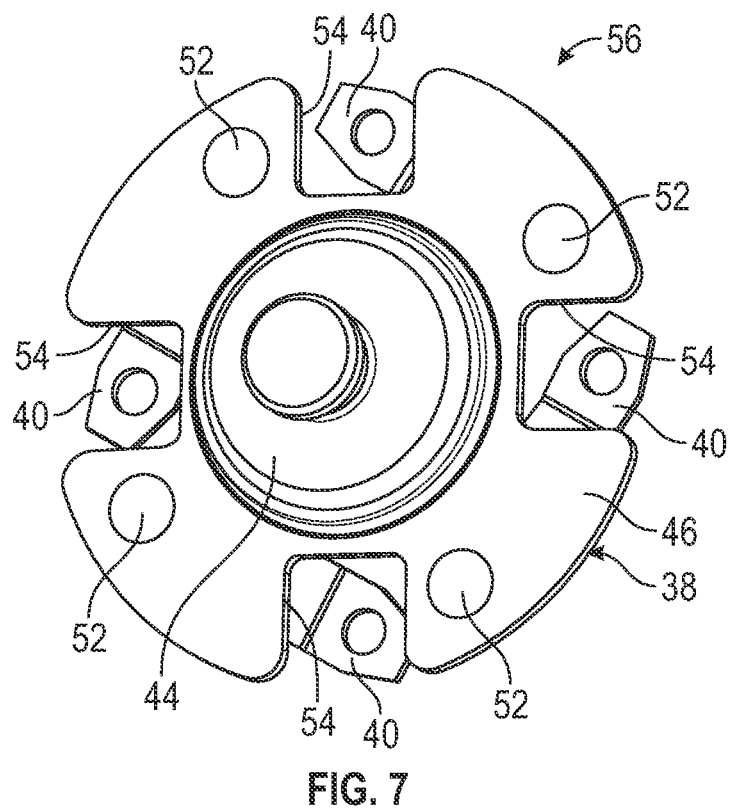
FIG. 7 is an enlarged view of the front boss and leaf springs and showing the leaf springs riveted to the front boss.

The front boss 38 includes a central portion 44 for piloting the torque converter 10 relative to the engine and, optionally, for receiving rotational input from the engine. The front boss 38 also includes a radially extending flange 46, to which the leaf spring 40 is attached, and an axially extending hub 48, upon which the piston 36 is supported. Rivet holes 50 are provided in the radial flange 46 of front boss 38 and allow for the use of rivets 52 for securing the leaf springs 40 to the front boss 38. When viewed axially, as seen in FIGS. 5-7, adjacent to the rivet holes 50 the front boss 38 is provided with a series of U-shaped grooves or recesses 54 in the radial flange 46. The recesses 54 are provide a space for receiving a riveting tool thereby enabling the leaf springs 40 to be riveted to the piston 36. Accordingly, a separate hole is not necessary for the riveting tool when riveting the leaf springs 40 to the piston 36. Likewise, a cap, for sealing such a hole is also not required The manufacturing process for assembly of the piston 36, clutch 34, front boss 38 and front cover 12 is as follows. Utilizing rivets 52, the front boss 38 is connected to the leaf spring(s) 40 to form a first assembly 56, which is seen in FIG. 7. The leaf spring(s) 40 of the first assembly 56 are then connected by rivets 60 to the piston 36, utilizing the recesses 54 to access the leaf spring(s) 40 and the piston 36, forming a second assembly 58, which is seen in FIG. 6. The second assembly 58 is then freely assembled with the dual facing clutch 34 forming a third assembly 62, seen on the right side of FIG. 5. In this regard, the dual facing clutch 34 is generally in the form of a ring and overlies an outer, radially extending flange 64 of the piston 36. Next, the third assembly 62 is positioned with the central portion 44 of the front boss 38 extending through a central opening 64 of the front cover 12 and the radial flange 46 of the front boss 38 extending in surface-to-surface contact with an interior surface of the front cover 12 about the central opening 64. The front boss 38 is then welded with the front cover 12 on the exterior side of the front cover 12 assembly, thereby forming a fourth assembly 66, the front side of which is seen in FIG. 3 and the rear side of which is seen in FIG. 4.

During operation, the piston 36 can move freely in the axial direction X, based on the oil pressure of various chambers in the torque converter 10 and based on an axial force designed into leaf springs 50. During the lock-up OFF condition of the clutch assembly 32, the oil pressure in chamber 68 is higher than the oil pressure in chamber 70. Notably, a portion of chamber 68 extends between the piston 36 and the radial flange 46 of the front boss 38. The piston 36 will move toward impeller side (to the right in FIG. 2) of the torque converter 10 and the turbine hub 28 will therefore be driven via the hydrodynamic circuit between the impeller 20 and turbine 24. During the lock-up ON condition of the clutch assembly 32, the oil pressure in chamber 70 will be greater than the oil pressure than chamber 68. As a result, the piston 36 will move toward front cover 12 (to the left in FIG. 2) and the turbine hub 28 will be driven directly by the front boss 38 and front cover 12, through the clutch assembly 32 and the damper assembly 30.

With the present construction, no potential oil leak through the piston 36 arises because of the presence of a hole and cap in the piston 36 and used to secure the piston to the front cover 12. With the present construction, the hole and cap are eliminated. Rivets 52 are used for the connection between a leaf springs 40 and the piston 36 and rivets 60 are used for the connection of the other end of the leaf springs 40 with the front boss 38. Utilizing this construction, the connection made by the leaf springs 40 can transfer torque from the front boss 38 to the piston 36, while also allowing the piston 36 to move freely in the axial direction X. Since the front boss 38 is connected with the piston 36 solely by the leaf springs 40 and rivets 52, no weld is located interiorly of the torque converter 10. Further, by integrating the front boss 38 and front cover 12, a short axial length can be achieved. With the shortened axial length, the present torque converter 10 design is especially adapted for applications with limited packaging space, such as a front wheel drive application, although it is not limited to such applications.

The leaf springs 40 may each extend along a straight line between the rivets 52, 60 or be curved. The opposing ends of the leaf springs 40 may also extend in parallel planes and be connected by a planar middle portion, angled therebetween. Alternatively, the middle portion may be curved between the end portions. The leaf springs 40 may alternatively be flat and the front boss 38 may include a stepped portion for mounting therewith. In still another alternative construction, each of the leaf springs 40 may be formed by stacked layers of material, preferably a metal material.

Figure 8:
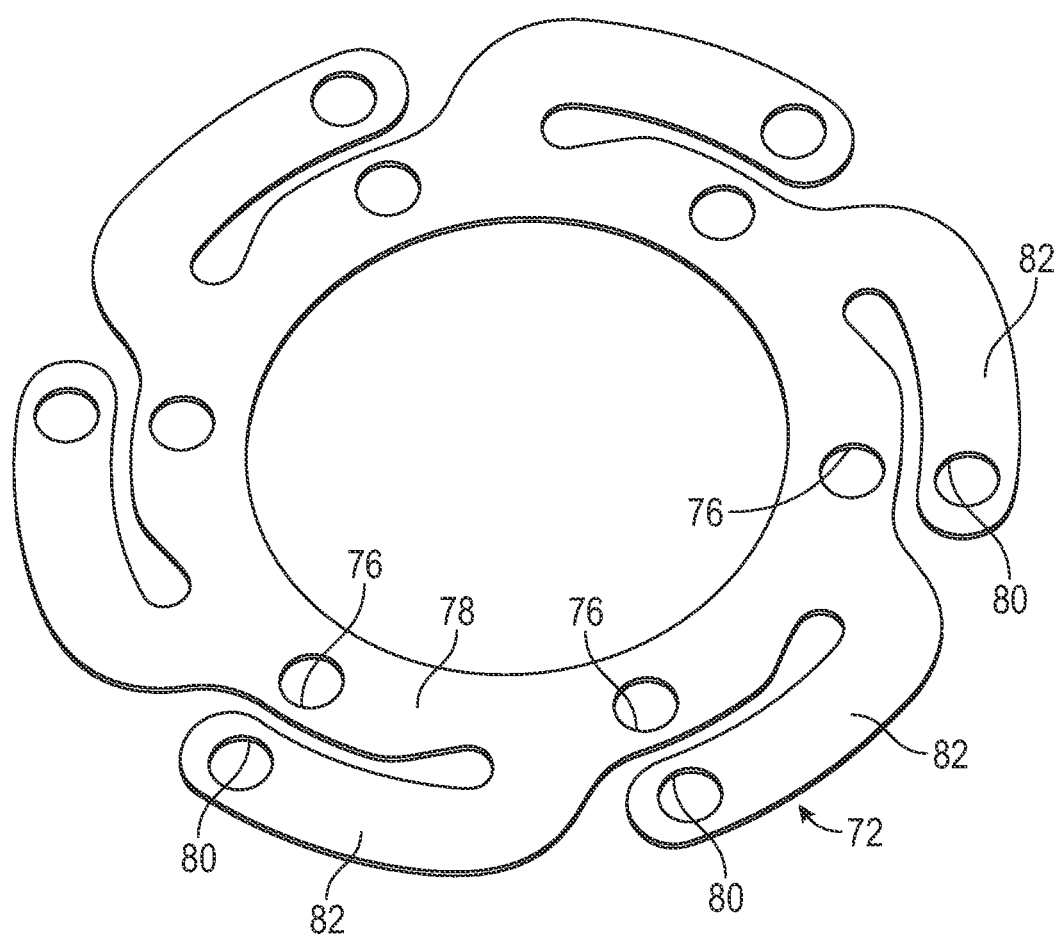
FIG. 8 illustrates a one-piece leaf spring as may be used in a torque converter embodying the principles of the present invention.
Figure 9A:
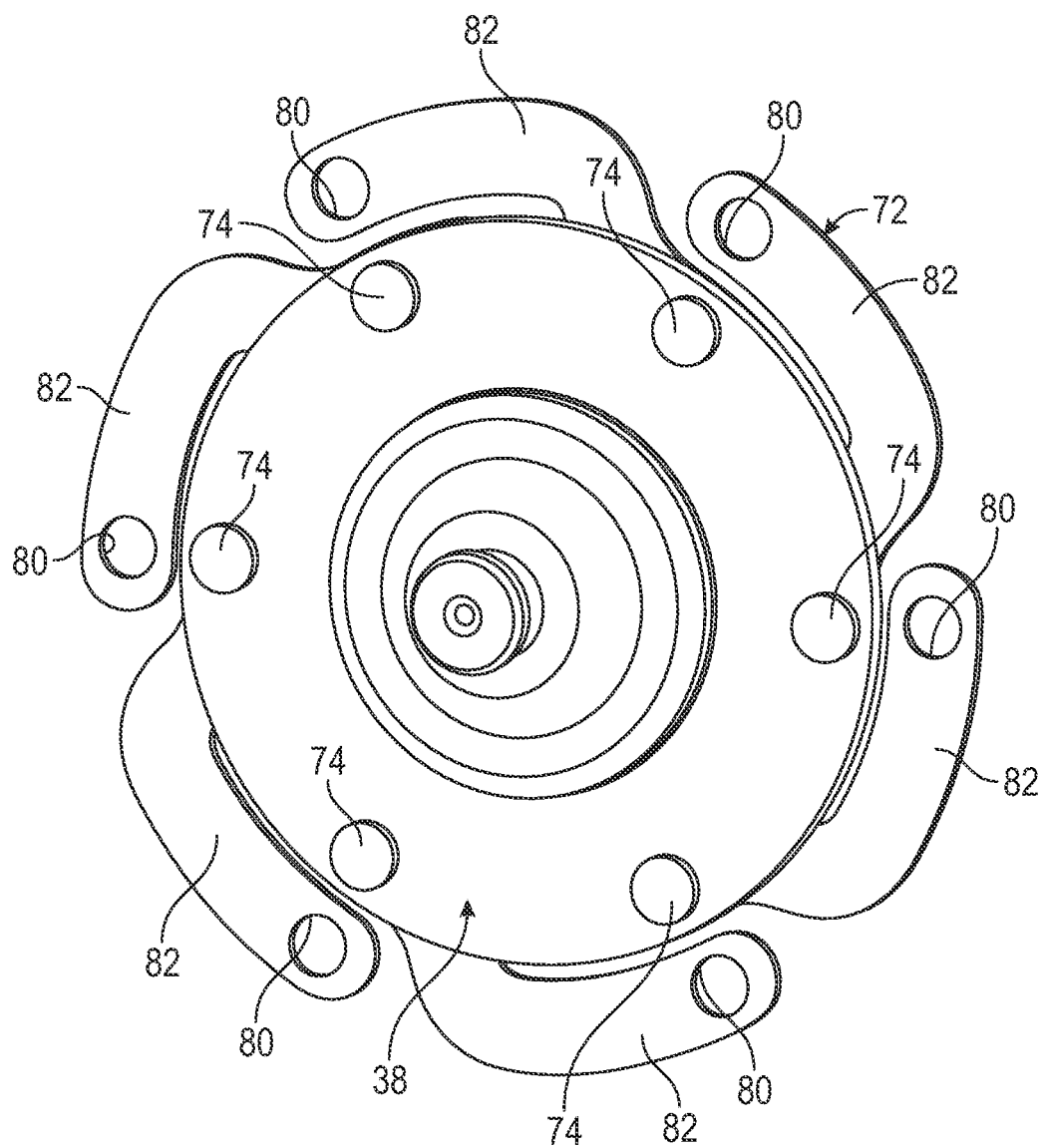
FIGS. 9A and 9B illustrate the one-piece leaf spring of FIG. 8 mounted to a front boss.
Figure 9B:
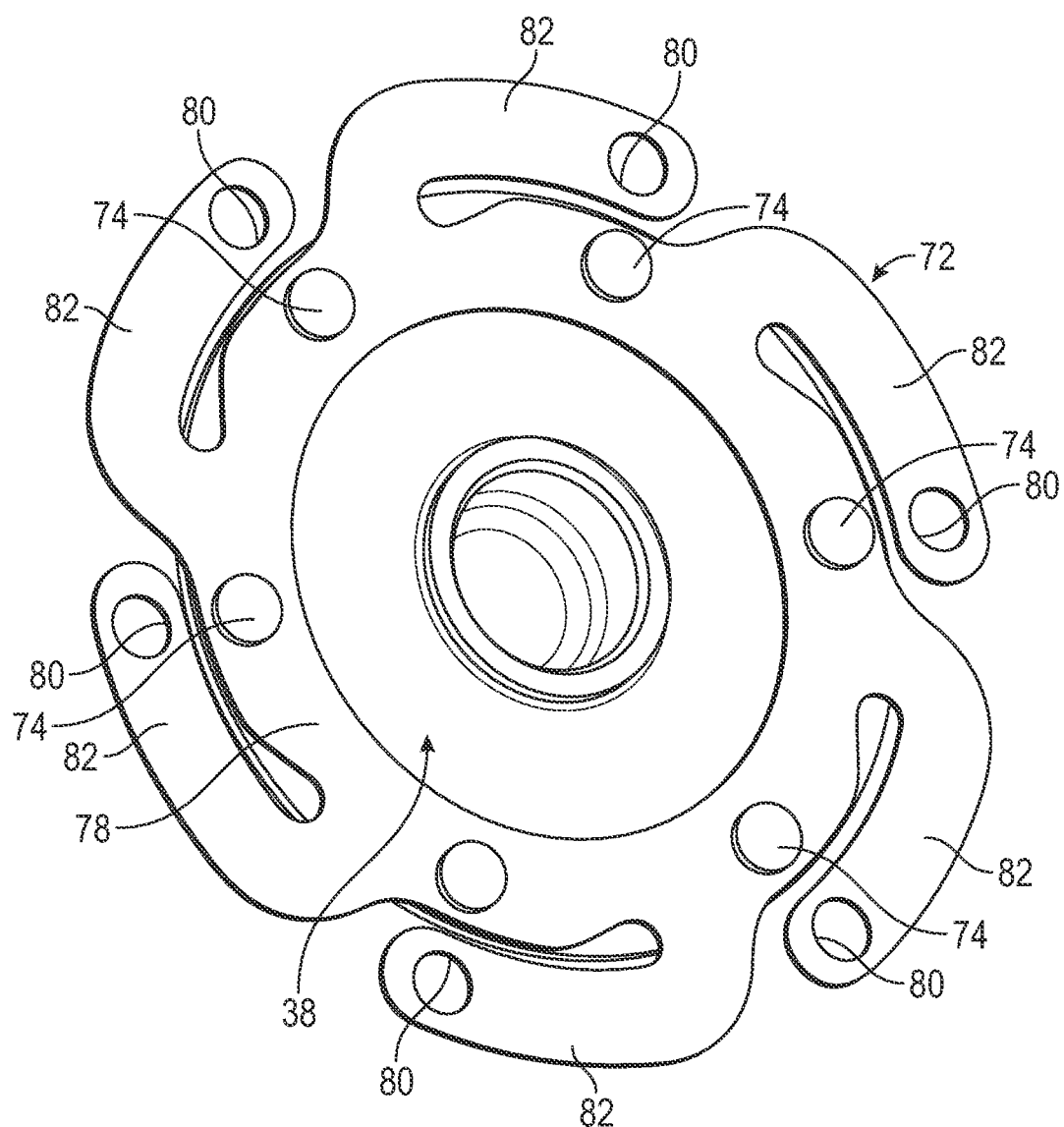

Also, instead of a plurality of separate leaf springs 40 (four being seen in the figures discussed so far) the leaf springs may be incorporated into a unitary, one-piece construction leaf spring 72 formed of a stamped metal, such as spring steel. An example of a one-piece stamped leaf spring 72 is illustrated in FIG. 8. In FIGS. 9A and 9B, the one-piece leaf spring 72 is shown mounted to the front boss 38 by rivets 74 extended through rivet holes 76 provided in an inner ring 78 of the leaf spring 72. The leaf spring 72 may be connected to the piston 36 by rivets (not shown) extended through rivet holes 80 provided in the ends of spring arms 82 that extend from the inner ring 78. The rivet holes 80 may be provided so as to form radially aligned pairs with the rivet holes 76 used in securing the leaf spring 72 to the front boss 38.

While a dual facing clutch 34 is illustrated herein (friction material being provided on two opposing faces of the clutch 34), it will be readily apparent that in one alternative construction a multi-plate clutch may be employed.

As a person skilled in the art will really appreciate, the above description is meant as an illustration of at least one implementation of the principles of the present invention. This description is not intended to limit the scope or application of this invention since the invention is susceptible to modification, variation and change without departing from the spirit of this invention, as defined in the following claims.

I claim:

1. A torque converter comprising:
   a shell including a front cover assembly and a rear cover, the shell defining a central axis, the front cover assembly including a front cover and a front boss, the front boss being fixedly mounted to the front cover;
   an impeller;
   a turbine located within the shell;
   a lock-up clutch;
   a piston, the piston being axially moveable relative to the front cover assembly along the central axis; and
   a leaf spring positioned between the piston and the front cover assembly, the leaf spring connecting the piston to the front cover assembly.

2. The torque converter according to claim 1, wherein the leaf spring is connected to the piston by at least one rivet and the leaf spring is connected to the front cover assembly by at least one rivet.

3. The torque converter according to claim 2, wherein the leaf spring is connected to the front boss of the front cover assembly by the at least one rivet.

4. The torque converter according to claim 1, wherein the leaf spring is one of a plurality of leaf springs.

5. The torque converter according to claim 4, wherein each of the leaf springs is separate and independent of the others of the leaf springs.

6. The torque converter according to claim 5, wherein the leaf springs are non-planar.

7. The torque converter according to claim 1, wherein the leaf spring is a one-piece leaf spring, the one-piece leaf spring being connected to the piston at multiple locations about the piston.

8. The torque converter according to claim 7, wherein the leaf spring is connected to the piston by a rivet at each of the multiple locations about the piston.

9. The torque converter according to claim 8, wherein the leaf spring includes a plurality of spring arms extending from an inner ring of the leaf spring and is connected to the piston by the rivets at the spring arms.

10. The torque converter according to claim 9, wherein the leaf spring is planar.

11. The torque converter according to claim 1, wherein the front boss includes an axially extending hub and the piston is supported on the axially extending hub of the front boss.

12. The torque converter according to claim 1, wherein the front boss includes a radially extending flange that overlies a radially extending portion of the front cover.

13. The torque converter according to claim 12, wherein the radially extending flange of the front boss is in surface-to-surface contact with the radially extending portion of the front cover.

14. The torque converter according to claim 12, wherein the radially extending flange is positioned interiorly of the shell.

15. The torque converter according to claim 14, wherein the weld is located on an exterior surface of the shell.

16. The torque converter according to claim 1, wherein the front boss is connected to the front cover by a weld.

17. A torque converter comprising:
   a shell including a front cover assembly and a rear cover, the shell defining a central axis, the front cover assembly including a front cover and a front boss, the front boss being fixedly mounted to the front cover;
   an impeller;
   a turbine located within the shell;
   a lock-up clutch;
   a piston, the piston being axially moveable relative to the front cover assembly along the central axis; and
   a leaf spring positioned between the piston and the front cover assembly, the leaf spring connecting the piston to the front cover assembly, the leaf spring being connected to the front boss of the front cover assembly by at least one rivet, and the leaf spring being connected to the front cover by the front boss.

18. The torque converter according to claim 1, wherein the front cover includes a central aperture and the front boss is mounted in the central aperture to the front cover.

19. The torque converter according to claim 18, wherein a central portion of the front boss extends through the central aperture, the central portion being welded to the front cover about the central aperture.

20. A torque converter comprising:
a shell including a front cover assembly and a rear cover, the shell defining a central axis, the front cover assembly including a front cover and a front boss, the front boss being fixedly mounted to the front cover;
an impeller;
a turbine located within the shell;
a lock-up clutch;
a piston, the piston being axially moveable relative to the front cover assembly along the central axis; and
a leaf spring positioned between the piston and the front cover assembly, the leaf spring connecting the piston to the front cover assembly, the front boss including a radially extending flange, and the leaf spring being connected to the front cover assembly at the radially extending flange of the front boss.

* * * * *